US009554308B2

(12) United States Patent
Ambriss et al.

(10) Patent No.: US 9,554,308 B2
(45) Date of Patent: Jan. 24, 2017

(54) DELAYING A TRIGGER OF A SCHEDULING REQUEST AFTER HANDOVER (71) Applicant: QUALCOMM Incorporated, San Diego, CA (US)

(72) Inventors: Mouaffac Ambriss, San Diego, CA (US); Mutaz Zuhier Afif Shukair, San Diego, CA (US); Salil Sawhney, San Diego, CA (US); Deepak Krishnamoorthi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 14/463,085

(22) Filed: Aug. 19, 2014

(65) Prior Publication Data
US 2015/0282207 A1    Oct. 1, 2015

Related U.S. Application Data (60) Provisional application No. 61/970,340, filed on Mar. 25, 2014.

(51) Int. Cl.
H04W 36/00    (2009.01)
H04W 48/16    (2009.01)
H04W 72/12    (2009.01)
H04W 76/02    (2009.01)

(52) U.S. Cl.
CPC ..... *H04W 36/0055* (2013.01); *H04W 36/0011* (2013.01); *H04W 48/16* (2013.01); *H04W 72/1284* (2013.01); *H04W 76/027* (2013.01)

(58) Field of Classification Search
CPC .................. H04W 36/0055; H04W 36/0011; H04W 76/027; H04W 76/1284; H04W 48/16; H04W 72/1284; H04W 76/02
See application file for complete search history.

(56) References Cited

U.S. PATENT DOCUMENTS 8,457,618 B2   6/2013   Narasimha et al.
8,666,389 B2   3/2014   Hsu
8,676,206 B2   3/2014   McGilly et al.
(Continued)

FOREIGN PATENT DOCUMENTS

EP   2530993 A1   12/2012
EP   2661138 A1   11/2013

OTHER PUBLICATIONS

ISA/EPO, International Search Report and Written Opinion of the International Searching Authority, Int'l. App. No. PCT/US2015/020685, Jul. 15, 2014, European Patent Office, Rijswijk, NL, 13 pgs.
(Continued)

*Primary Examiner* — Jianye Wu
(74) *Attorney, Agent, or Firm* — Holland & Hart LLP (57) ABSTRACT Methods, systems, and devices are described for transmitting scheduling requests for uplink transmission resources following a handover. A user equipment (UE) may determine that a handover from a first base station to a second base station has occurred, and may implement one or more processes to enhance efficiency in communications following the handover. A UE, for example, may wait for successful acquisition and/or derivation of timing information from a base station before attempting to schedule uplink resources with the base station.

27 Claims, 9 Drawing Sheets (56) References Cited

U.S. PATENT DOCUMENTS

| | | | |
|---|---|---|---|
| 2007/0260851 A1* | 11/2007 | Taha | H04W 52/0229 |
| | | | 712/204 |
| 2008/0318578 A1* | 12/2008 | Worrall | H04W 36/02 |
| | | | 455/437 |
| 2011/0117908 A1 | 5/2011 | Huang et al. | |
| 2011/0268085 A1 | 11/2011 | Barany et al. | |
| 2012/0040674 A1* | 2/2012 | McGilly | H04W 36/0066 |
| | | | 455/436 |
| 2013/0010619 A1* | 1/2013 | Fong | H04W 74/002 |
| | | | 370/252 |
| 2013/0194994 A1* | 8/2013 | Dayal | H04W 76/048 |
| | | | 370/311 |
| 2014/0092859 A1* | 4/2014 | Takano | H04L 5/0092 |
| | | | 370/329 |
| 2014/0112180 A1 | 4/2014 | Axmon et al. | |
| 2014/0315549 A1* | 10/2014 | Zhang | H04W 48/08 |
| | | | 455/434 |
| 2015/0117342 A1* | 4/2015 | Loehr | H04W 72/1284 |
| | | | 370/329 |

OTHER PUBLICATIONS

IPEA/EPO, Second Written Opinion of the International Preliminary Examining Authority, Int'l. App. No. PCT/US2015/020685, Mar. 10, 2016, European Patent Office, Munich, DE, 8 pgs.

IPEA/EPO, Third Written Opinion of the International Preliminary Examining Authority, Intl. App. No. PCT/US2015/020685, Jun. 9, 2016, European Patent Office, Munich, DE, 8 pgs.

* cited by examiner

DELAYING A TRIGGER OF A SCHEDULING REQUEST AFTER HANDOVER

CROSS REFERENCES

The present Application for Patent claims priority to U.S. Provisional Patent Application No. 61/970,340 by Ambriss et al., entitled "Delaying A Trigger Of A Scheduling Request After Handover," filed Mar. 25, 2014, and assigned to the assignee hereof.

BACKGROUND

The following relates generally to wireless communication, and more specifically to scheduling request transmission via a wireless communication device following handover between base stations. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicate with mobile devices on downstream and upstream links. Each base station has a coverage range, which may be referred to as the coverage area of the cell. As mobile devices move between coverage areas, a handoff occurs, in which communications with the mobile device are handed off from one base station in an initial coverage area to another base station in another coverage area.

A handoff procedure often includes exchanging information between the base stations, as well as providing instructions and information to the mobile device related to the handoff. Information exchanged between base stations may include, for example, context information related to data and/or other communications between the initial base station and the mobile device. The mobile device may be instructed that a handover is to be completed via radio resource control (RRC) signaling. In some handover cases, a mobile device may be located at an edge of a base station's coverage area, which may result in reduced signal quality and increased numbers of retransmissions in order to successfully transmit certain communications. In some instances, such retransmissions may result in inefficiencies in the event that a mobile device attempts to take certain actions before transmissions related to handover are successfully received.

SUMMARY

The described features generally relate to one or more improved systems, methods, and/or apparatuses for transmitting scheduling requests for uplink transmission resources following a handover. In some examples, a user equipment (UE) may determine that a handover from a first base station to a second base station has occurred, and may implement one or more processes to enhance efficiency in communications following the handover. In some examples, a UE may wait for successful acquisition and/or derivation of timing information from a base station before attempting to request uplink resources from the base station.

In some embodiments, a method of wireless communications includes determining that a handover from a first base station to a second base station has occurred, and delaying a trigger of a scheduling request following the handover.

In some embodiments, an apparatus of wireless communications includes means for determining that a handover from a first base station to a second base station has occurred, and means for delaying a trigger of a scheduling request following the handover.

In some embodiments, an apparatus of wireless communications includes a processor, a memory in electronic communication with the processor, and instructions stored in the memory. The instructions may be executable by the processor to determine that a handover from a first base station to a second base station has occurred, and delay a trigger of a scheduling request following the handover.

In some embodiments, a computer program product for wireless communications includes a non-transitory computer-readable medium storing instructions executable by a processor to determine that a handover from a first base station to a second base station has occurred, and delay a trigger of a scheduling request following the handover.

Various embodiments of the method, apparatuses, and/or computer program products may include the features of, means for, and/or processor-executable instructions for determining that a System Information Block (SIB) has been received before the handover has occurred. In some cases, delaying the trigger of the scheduling request includes delaying the trigger of the scheduling request until a condition is satisfied. The condition being satisfied may include receiving a Master Information Block (MIB) from the second base station. In some cases, delaying the trigger of the scheduling request includes delaying the scheduling request for a predetermined time period following the handover. The predetermined time period may correspond to an expected acquisition or an expected derivation of uplink timing through a Master Information Block (MIB) from the second base station. Delaying the trigger of the scheduling request may include determining that data is to be transmitted following the handover, determining if a Master Information Block (MIB) has been received from the second base station, and delaying the trigger of the scheduling request for a predetermined time period. The predetermined time period may correspond to an expected acquisition or an expected derivation of uplink timing through the MIB from the second base station.

Various embodiments of the method, apparatuses, and/or computer program products may include the features of, means for, and/or processor-executable instructions for determining, after expiration of the predetermined time period, whether the MIB has been received, and further delaying the trigger of the scheduling request for the predetermined time period responsive to determining that the MIB is not received.

Various embodiments of the method, apparatuses, and/or computer program products may include the features of, means for, and/or processor-executable instructions for triggering the scheduling request responsive to determining that the MIB has been received.

Various embodiments of the method, apparatuses, and/or computer program products may include the features of, means for, and/or processor-executable instructions for initiating a radio link failure (RLF) procedure in the absence of a receipt of the MIB within a second predetermined time period. In some cases, the predetermined time period corresponds to a predetermined number of Long Term Evolution (LTE) frames.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Described embodiments are directed to one or more improved systems, methods, and/or apparatuses for transmitting scheduling requests for uplink transmission resources following a handover. In some aspects of the present disclosure, a user equipment (UE) may determine that a handover from a first base station (e.g., a source base station), to a second base station (e.g., a target base station) has occurred, and may implement one or more processes to enhance efficiency in communications following the handover. In existing deployments, inefficiencies may occur, for example, when a UE tries to initiate an uplink transmission prior to successful acquisition and/or derivation of timing information from a target base station following a handover. In such instances, the UE may initiate a random access procedure using a random access channel (RACH) associated with the target base station. Such a random access procedure may consume additional resources at both the UE and base station, may take significantly longer than a transmission of a scheduling request, which could be transmitted if the UE had the timing information from the target base station. In some examples, following a handover, a UE may wait for timing information to be successfully received and/or derived from a base station before attempting to schedule uplink resources with the base station.

In certain examples, a UE may wait a predetermined time period following a handover prior to initiating a scheduling request. In other examples, a UE may determine if timing information has been received and/or derived following a handover, and if the timing information is received and/or derived may transmit a scheduling request. In some cases, uplink timing information may be derived from downlink timing, such as from downlink timing information which has been received. If timing information is not received and/or derived, the UE may delay transmitting the scheduling request for a fixed delay period. In some examples, the UE may determine if a master information block (MIB) has been received from the target base station, which contains timing information for the base station. If the MIB has not been received, the UE may wait the fixed delay period prior to sending a scheduling request. A UE, in some examples, may wait the fixed delay period and re-check to determine if the MIB has been received prior to sending the scheduling request. The fixed delay period may, for example, correspond to an expected receipt time for receiving a transmission or retransmission of a MIB from the target base station. In some deployments, a MIB may be transmitted one or more times in a MIB update time period (e.g., 10 ms, etc.), and the fixed delay period may also be set to the MIB update time period in order to allow for successful reception and timing acquisition based on the MIB. In some cases, a random access procedure, such as via a RACH, that is triggered by a pending uplink transmission may be suspended or suppressed, while waiting for reception of the MIB.

Figure 1:
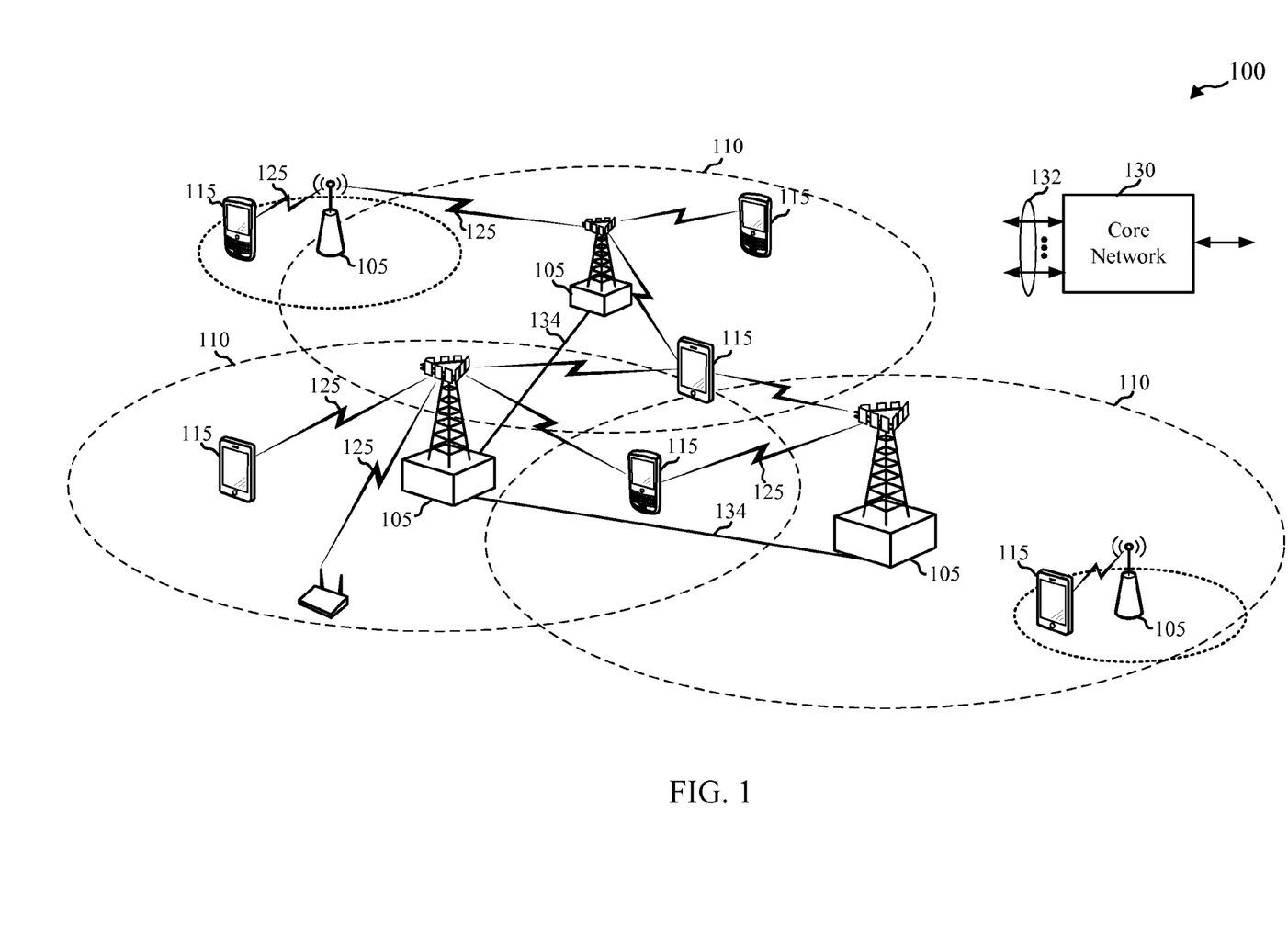
FIG. 1 shows an example wireless communications system diagram of mobile devices communicating with multiple base stations according to aspects of the disclosure.

Referring first to FIG. 1, an example wireless communication system 100 may include a plurality of UEs 115 that may communicate with a core network 130 via one or more base stations (or cells) 105. The base stations 105 may communicate with the UEs 115 under the control of a base station controller (not shown), which may be part of the core network 130. Base stations 105 and UEs 115 may be referred to generally as wireless communications devices.

Base stations 105 may communicate control information and/or user data with the core network 130 through backhaul links 135 (e.g., S1, etc.). In some embodiments, the base stations 105 may communicate, either directly or indirectly, with each other over backhaul links 125 (e.g., X2, etc.), which may be wired or wireless communication links. The wireless communication system 100 may support operation on multiple carriers (waveform signals of different frequencies). Multi-carrier transmitters can transmit modulated signals simultaneously on the multiple carriers. For example, each communication link 120 may be a multi-carrier signal modulated according to various radio technologies. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base station 105 sites may provide communication coverage for a respective geographic coverage area 110. In the event that a UE 115 moves between coverage areas 110, base stations 105 for the respective coverage areas may initiate a handover of the UE 115 to change which base station 105 communicates with the UE 115. A UE 115, as will be discussed in more detail below, may delay certain actions following a handover in some examples, in order to avoid relatively inefficient procedures for initiating uplink communications with a base station 105.

In some embodiments, the base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The geographic coverage area 110 for a first base station 105 may be divided into sectors making up only a portion of the coverage area (not shown). The wireless communication system 100 may include base stations 105 of different types (e.g., macro, micro, and/or pico base stations). There may be overlapping coverage areas for different technologies.

The wireless communication system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The UEs 115 are dispersed throughout the wireless communication system 100, and each UE 115 may be stationary or mobile. A UE 115 may also be referred to as a mobile device, a mobile station, a subscriber station, a mobile unit, a subscriber unit, a wireless unit, a remote unit, a UE, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a two-way radio, a radio cellular phone, a personal digital assistant (PDA), a wireless modem, a wireless communication device, a handheld device, a tablet computer, a laptop computer, a cordless phone, a wireless local loop (WLL) station, or the like.

The communication links 120 shown in wireless communication system 100 may include uplink (UL) and/or downlink (DL) transmissions between a UE 115 and a base station 105. The downlink transmissions may also be called forward link transmissions while the uplink transmissions may also be called reverse link transmissions. The communication links 120 may utilize different air interfaces of different radio access technologies (RATs).

Figure 2A:
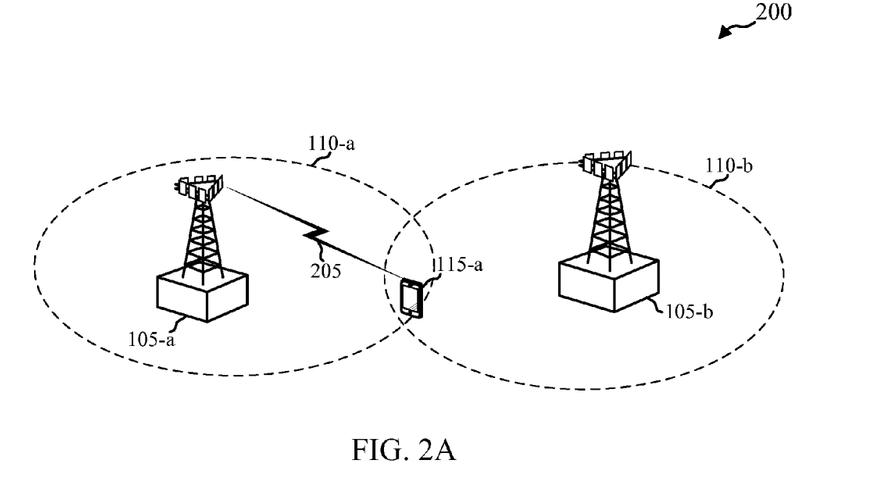
FIG. 2A shows an example of a mobile device communicating with a first base station prior to a handover, according to aspects of the disclosure.

As mentioned above, a UE 115 may change coverage areas 110 associated with different base stations 105. Turning now to FIG. 2A, handover in an example wireless communication system 200 is discussed in accordance with various examples. The wireless communication system 200 may be an example of the wireless communication system 100 described above with reference to FIG. 1. In this example, a UE 115-a may initially be within coverage area 110-a of base station 105-a. The UE 115-a may communicate with base station 105-a using communication link 205. As illustrated in FIG. 2A, the UE 115-a may be close to an edge of coverage area 110-a, and also be within coverage area 110-b of a second base station 105-b.

At some point, the UE 115-a and/or base station 105-a may determine that it is desirable for the UE 115-a to be handed over to base station 105-b. Such a determination may be made according to a number of factors that are well known in the art. For example, measurement reports from UE 115-a may indicate that a handover may be desirable. Of course, as will be readily recognized by one of skill in the art, numerous other factors may be taken into account in making a handover decision, such as movement of UE 115-a and/or loading at base station 105-a, to name but two examples. Once a handover decision is made, base station 105-a may initiate a handover with a handover request transmitted to base station 105-b. Base station 105-b may acknowledge the handover request and base station 105-a may transfer various items of information (e.g., sequence number status information, user plane data, etc.) to base station 105-b to help enable a seamless transition of UE 115-a from source base station 105-a to target base station 105-b. An RRC connection reconfiguration may be transmitted to UE 115-a, and the UE 115-a may initiate a connection with base station 105-b.

Figure 2B:
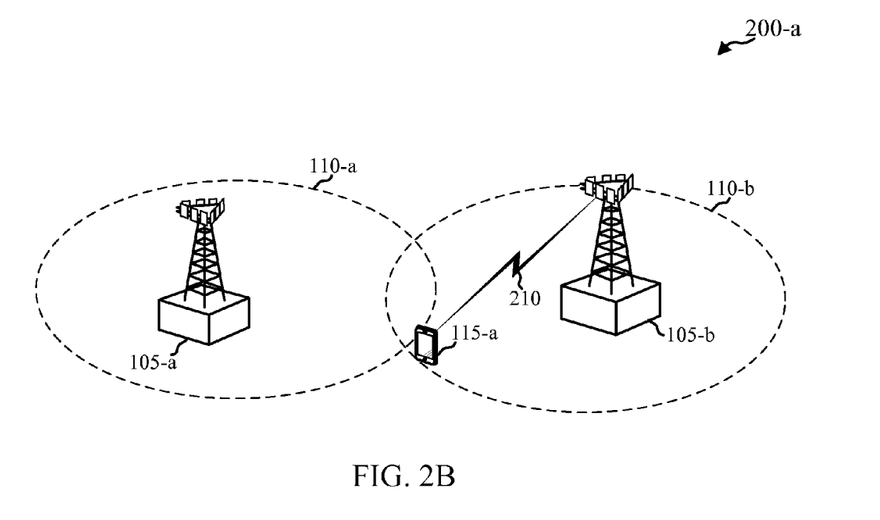
FIG. 2B shows an example of a mobile device communicating with a second base station following a handover, according to aspects of the disclosure.

FIG. 2B illustrates an example wireless communication system 200-a in which UE 115-a is handed over to target base station 105-b. The UE 115-a may communicate with base station 105-b following handover using communication link 210. As illustrated in FIG. 2B, the UE 115-a may be close to an edge of coverage area 110-b of base station 105-b. In such cases, UE 115-a may have relatively weak signal reception using communication link 210, which may result in a relatively high number of retransmissions of data before successful receipt of the data at UE 115-a. As part of the handover process, UE 115-a acquires and/or derives timing information of the target base station 105-b in order to have synchronized communications with target base station 105-b via communications link 210. Such timing information may be acquired through the reception and decoding of a master information block (MIB) that is transmitted by target base station 105-b. The MIB may be transmitted by target base station 105-b on a periodic basis, such as once per LTE frame (i.e., once every 10 ms).

In situations where UE 115-a may be close to an edge of coverage area 110-b, it is possible that the UE 115-a may not successfully receive and decode the MIB from target base station 105-b during the first transmission of the MIB following the handover. Thus, UE 115-a may need to receive one or more additional transmissions of the MIB in order to successfully receive and decode the MIB. In such cases, the UE 115-a may not have all of the timing information for initiating communications with the target base station 105-b until the MIB is successfully received and decoded.

However, as mentioned above, in some cases UE 115-a may determine that there is data in the UE's buffer that is to be transmitted. In such cases, the UE 115-a may transmit a scheduling request (SR) to the target base station 105-b to initiate an uplink transmission of the data in the UE 115-b buffer. In cases where UE 115-a has not successfully acquired and/or derived timing information for the target base station 105-b, the UE 115-a may initiate a random access procedure to access the target base station 105-b. As noted above, such a random access procedure can be resource intensive and relatively inefficient. Accordingly, according to various examples, the UE 115-a may suppress or suspend a random access procedure that may otherwise be triggered by the pending uplink transmission. The UE 115-a may wait for a certain time period, or for a certain condition to be satisfied, following handover prior to initiating uplink communications with target base station 105-b. Such a delay may be implemented according a number of techniques, as will be discussed in more detail below.

Figure 3:
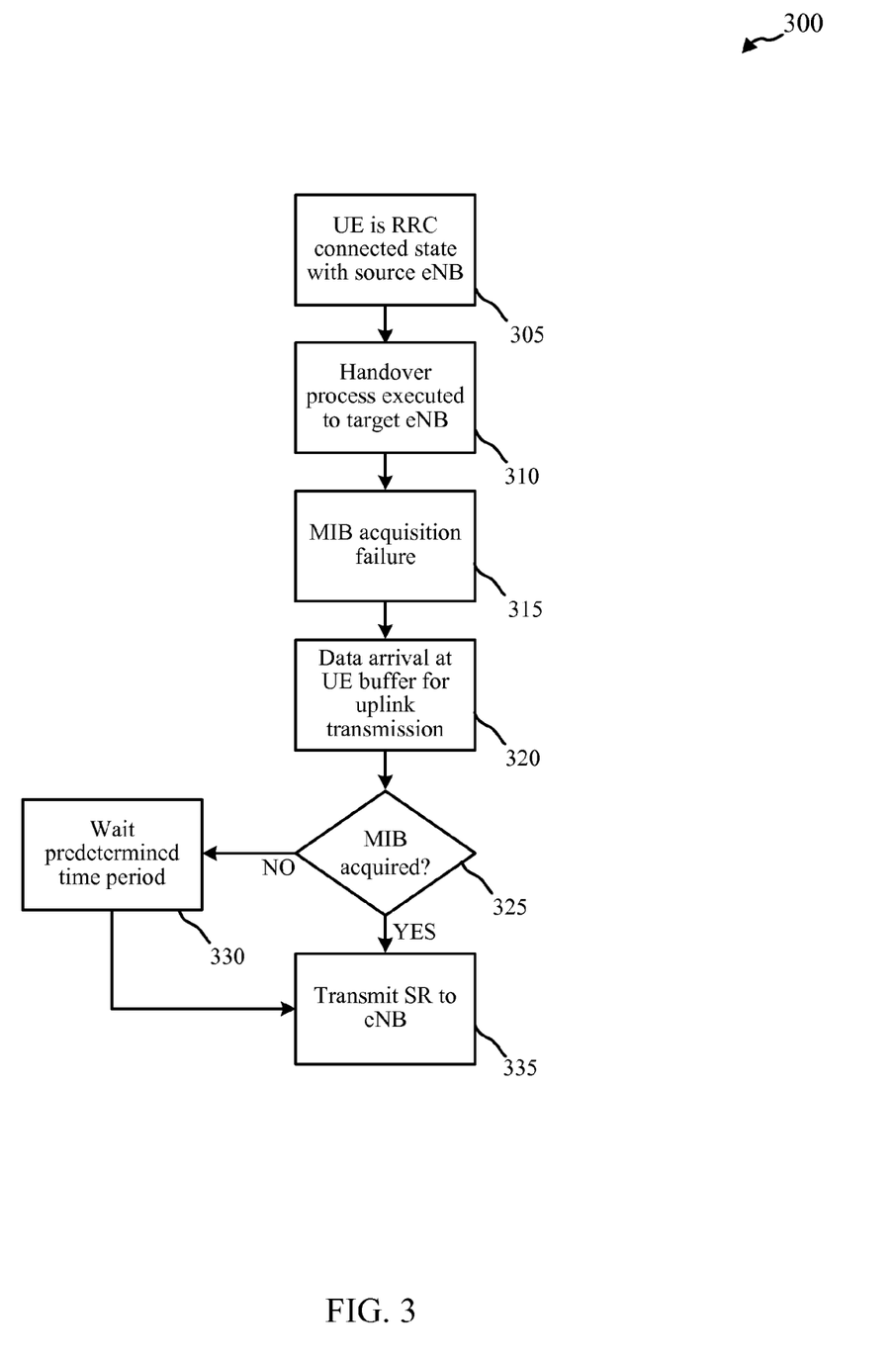
FIG. 3 is a flowchart of a method for requesting UL resources from a target base station according to aspects of the disclosure.

FIG. 3 shows a flowchart of a method 300 for reducing payload size for a wireless communications device according to aspects of the disclosure. The method 300 may be implemented by one or more of the UEs 115 of FIGS. 1, 2A, and/or 2B. Additionally or alternatively, the operations of the method 300 may be performed by the UEs 115 described below with reference to FIGS. 5A, 5B, and/or 6.

At block 305, the UE is in an RRC connected with a source eNB. For example, a UE 115 of one of the preceding figures may be RRC connected with a first base station 105 of one of the preceding figures. At block 310, a handover process in executed to target eNB. For example, a UE 115 of the preceding figures may be handed over to a target base station 105 of one of the preceding figures. Following the initiation of the handover process, the UE may determine that there was a failure in the acquisition of the MIB from the target eNB, as indicated at block 315. At block 320, there is data arrival at the UE buffer for an uplink transmission. In this example, rather than initiate the uplink transmission immediately by triggering a SR, causing an ultimately a random access procedure to be triggered due to lack of timing information, the UE determines if the MIB has been acquired, as indicated at block 325.

If the MIB has been not acquired, the UE waits a predetermined time, as indicated at block 330. In some examples, the predetermined time period corresponds to an expected time of receipt of another transmission from the target eNB that contains the MIB or timing information. For example, in an LTE system where an eNB transmits a MIB once per LTE frame, the predetermined time period may be 10 ms. In other examples, the predetermined time period may provide sufficient time to receive two or more transmission of timing information. Following the expiration of the predetermined time period, or if the MIB has been acquired as determined at block 325, the UE may transmit a SR to the eNB, as indicated at block 335. In such a manner, the UE may avoid an unnecessary random access procedure, and initiate the uplink data transmission more efficiently and more quickly than if a random access procedure had been initiated. While the example of FIG. 3 describes that the UE determines if a MIB has been acquired, in further examples a UE may simply wait a predetermined time period following a handover prior to triggering a SR (rather than determine if a MIB is acquired). In some cases, the UE may trigger a SR after a condition is satisfied, such as a MIB is acquired, and may not wait for a System Information Block (SIB), which may be received before handover and/or after the MIB, to trigger the SR.

Figure 4:
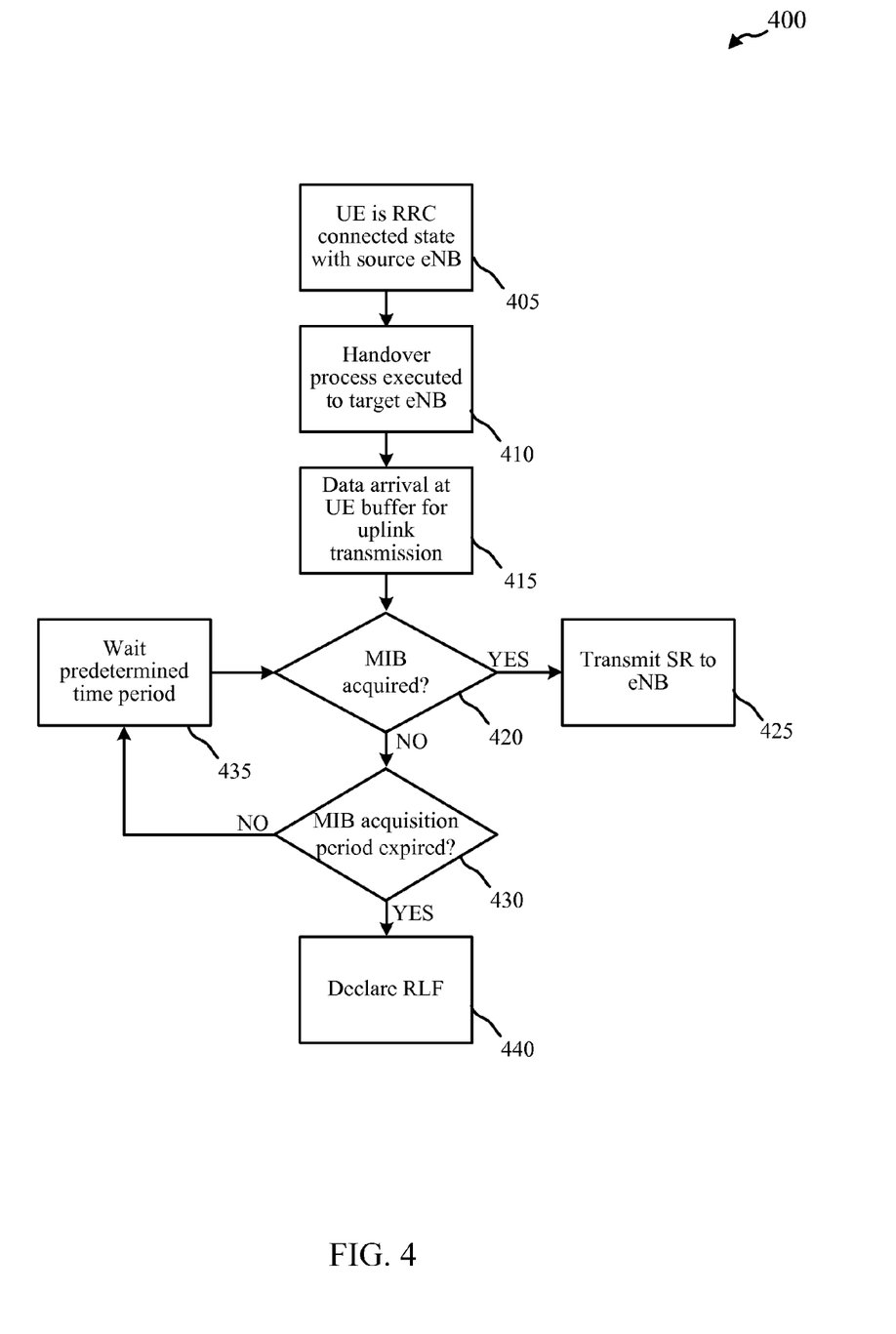
FIG. 4 is a flowchart of another method for requesting UL resources from a target base station according to aspects of the disclosure.

In still further examples, a UE may dynamically determine an amount of time to wait prior to triggering a SR. FIG. 4 shows a flowchart of a method 400 of such an example for delaying the trigger of a SR. The method 400 may be implemented by one or more of the UEs 115 of the preceding FIGS. 1, 2A, and/or 2B. Additionally or alternatively, the operations of the method 400 may be performed by the UEs 115 described with reference to FIGS. 5A, 5B, and/or 6.

At block 405, the UE is in an RRC connected with a source eNB. For example, a UE 115 of one of the preceding figures may be RRC connected with a first base station 105 of one of the preceding figures. At block 410, a handover process in executed to target eNB. For example, a UE 115 of the preceding figures may be handed over to a target base station 105 of one of the preceding figures. At block 415, there is data arrival at the UE buffer for an uplink transmission. In this example, the UE determines if the MIB has been acquired, as indicated at block 420. If the MIB has been acquired, the UE transmits a SR to the eNB, as indicated at block 425.

If the MIB has not been acquired, in the example of FIG. 4, the UE may determine if an MIB acquisition period has expired, as indicated at block 430. Such a time period may be a second predetermined time period, and may indicate that the UE is not able to reliably receive communications from the target eNB. In such a case, the UE may declare a radio link failure (RLF), as indicated at block 440. Following RLF, the UE may enter into a re-establishment process and attempt to establish a connection with a different or same eNB, for example. If the MIB acquisition period has not expired, the UE waits the predetermined time period (e.g., 10 ms, similarly as described above), as indicated at block 435, and operations of block 420 are repeated. In such a manner, a SR is not triggered until the MIB has been received at the UE. In such a manner, the UE may avoid an unnecessary random access procedure, and initiate the uplink data transmission more efficiently and more quickly than if a random access procedure had been initiated. In some cases, the UE may trigger a SR after a condition is satisfied, such as a MIB is acquired, and may not wait for a System Information Block (SIB), which may be received before handover and/or after the MIB, to trigger the SR.

Figure 5A:
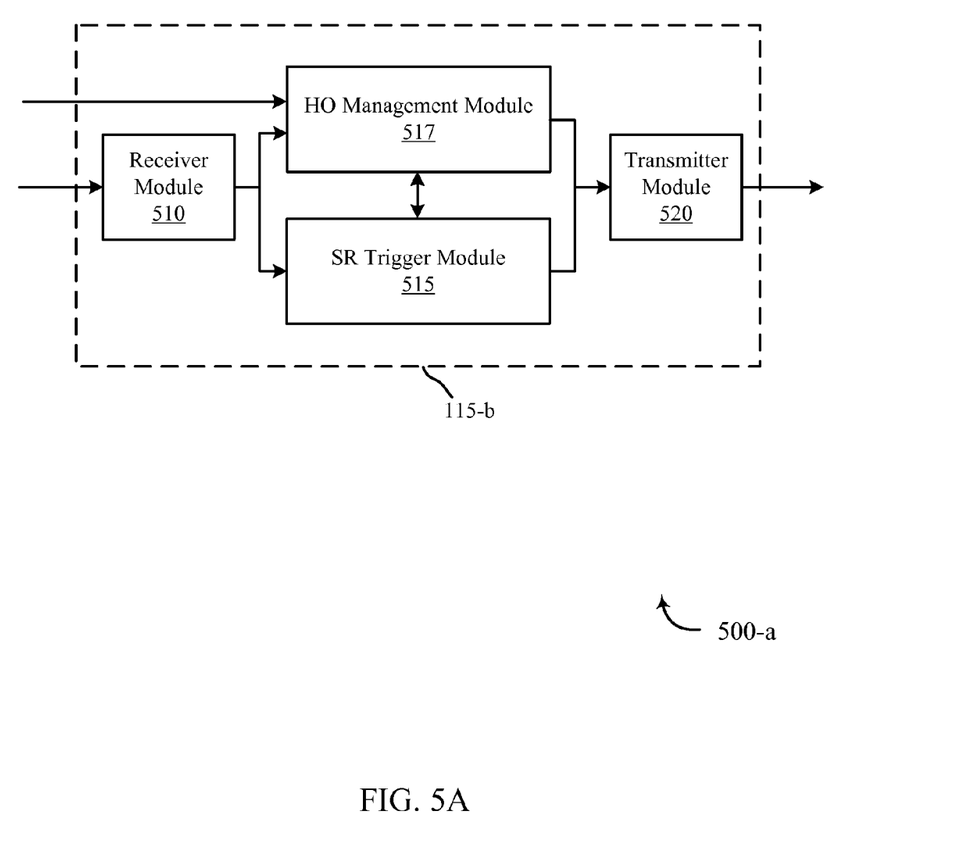
FIG. 5A shows a block diagram of an example of a wireless communications device according to aspects of the disclosure.

FIG. 5A shows a block diagram 500-a of an example of UE 115-b according to various aspects of the disclosure. The UE 115-b may be an example of one or more aspects of a UE 115 or base station 105 of FIGS. 1, 2A, and/or 2B, for example. The UE 115-b may include a receiver module 510, a transmitter module 520, a SR trigger module 515, and a handover (HO) management module 535. The UE 115-b may also include a processor (not shown), which may be part of the SR trigger module 515, for example. Each of these components may be in communication with each other.

The receiver module 510 may receive information such as packets, user data, and/or control information including headers, synchronization and pilot signals. The received information may be demodulated, descrambled, de-interleaved, and/or decoded. The information may be passed on to the SR trigger module 515, the HO management module 517, and to other components of the UE 115-b as appropriate or desired.

The receiver module 510 may include a single receiver or multiple receivers. For example, the receiver module 510 may include N receive antennas and R RF chains (not shown), where R is generally less than or equal to N. Each RF chain may include an RF module and an analog-to-digital converter (ADC). During operation, signals received by a receive antenna may be provided to an input of an RF chain. At the RF chain, the signals are processed (e.g., amplified, downconverted, filtered, etc.) by an RF module and digitized by the ADC. The output of the RF chain may be provided to the demodulator for further processing. The demodulator may combine signals received from multiple antennas using receive diversity techniques to increase the SINR of the received signals. The demodulator may use a suitable signal combining technique such as equal gain combining, maximum ratio combining (MRC), and the like. The demodulator and RF chains may use interference cancellation techniques to further provide interference cancellation and/or suppression (e.g., interference rejection combining, successive interference cancellation, and the like).

The transmitter module 520 may transmit information such as packets, user data, and/or control information including headers, synchronization and pilot signals. The transmitted information may be modulated, scrambled, interleaved, and/or coded. The information may be received from the SR trigger module 515, the HO management module 517, and from other components of the UE 115-*b* as appropriate or desired. In some embodiments, the transmitter module 520 may be collocated with the receiver module 510 in a transceiver module (not shown). The transmitter module 520 may include a single antenna, or it may include a plurality of antennas.

The SR trigger module 515 may employ the transmitter module 520 and the receiver module 510 (or a transceiver module) to trigger and transmit a scheduling request, as described herein. Further, the SR trigger module 515 may prepare a scheduling request, and/or determine whether a condition has been satisfied to trigger a scheduling request, such as an event based condition or a time based condition, as described herein.

The HO management module 517 may employ the transmitter module 520 and the receiver module 510 (or a transceiver module) to determine that handover has occurred or is going to occur, determine that there is uplink data for transmission, suspend or suppress a random access procedure to a target base station that may be triggered based on the pending uplink transmission prior to receiving uplink timing information for the target base station, and receive information from the SR trigger module 515 related to the event or time-based condition. In some examples, the HO management module 517 may initiate a radio link failure (RLF) procedure such as if a MIB is not received, as described herein.

The components of the UE 115-*b* may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors.

Figure 5B:
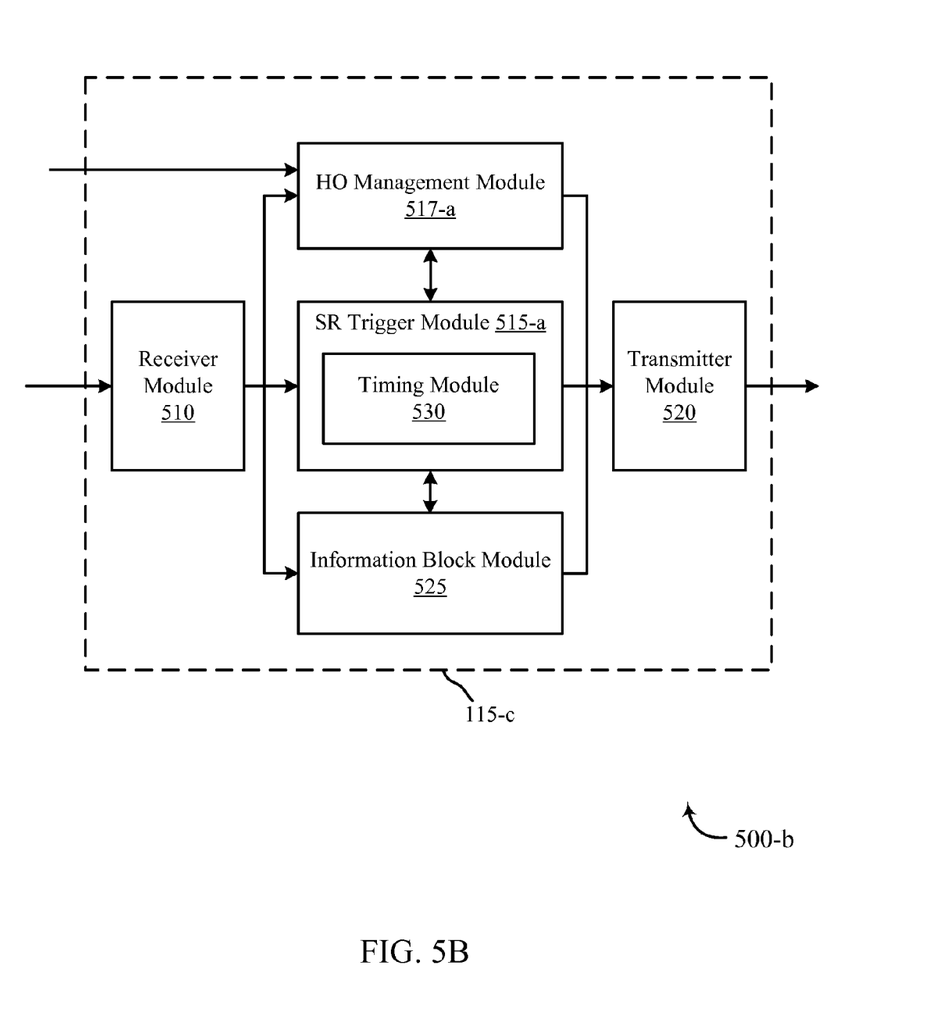
FIG. 5B shows a block diagram of another example of a wireless communications device according to aspects of the disclosure.

FIG. 5B shows a block diagram 500-*b* of an example of a UE 115-*c*. The UE 115-*c* may be an example of one or more aspects of a UE 115 described with reference to FIGS. 1, 2A, 2B, and/or 5A. The UE 115-*c* may include a receiver module 510, a transmitter module 520, a SR trigger module 515-*a*, a HO management module 517-*a*, and an information block module 525. The UE 115-*c* may also include a processor (not shown), which may be part of the SR trigger module 515-*a*, the HO management module 517-*a*, and/or the information block module 525, for example. Each of these components may be in communication with each other.

The receiver module 510 and the transmitter module 520 may be configured and may be employed as described above with respect to FIG. 5A. The SR trigger module 515-*a* may be configured and may implement operations as described above with respect to the SR trigger module 515 of FIG. 5A. The HO management module 517-*a* may be configured and may implement operations as described above with respect to the HO management module 517 of FIG. 5A.

Further, as illustrated in FIG. 5B, the UE 115-*c* may include an information block module 525. The information block module 525 may determine whether an information block (e.g., MIB, SIB, etc.) has been received from a target base station, for example. In some cases, the information block module 525 determines that a SIB has been received, such as before a handover. In some examples, the information block module 525 determines whether an event based condition has been satisfied, such as reception of a MIB, reception of a SIB, and the like.

The SR trigger module 515-*a* may include a timing module 530. The timing module 530 may perform timing operations. The timing module 530 may determine whether a time based condition has been satisfied, such as expiration of a predetermined time period. The timing module 530 may determine one or more predetermined time periods, such as based on a predetermined number of Long Term Evolution (LTE) frames or subframes, an expected acquisition of timing for a target base station (e.g., via information in a MIB, etc.), and/or an expected derivation of timing for a target base station (e.g., via detection and/or decoding of a MIB, etc.). In some cases, the timing module 530 may wait a predetermined time period, such as to either trigger a SR, or determine if a MIB has been received, such as described above. In some examples, the timing module may be configured to time a second predetermined time period that may be used to declare a RLF in the event that the MIB has not been received within the second predetermined time period, such as described above.

Figure 6:
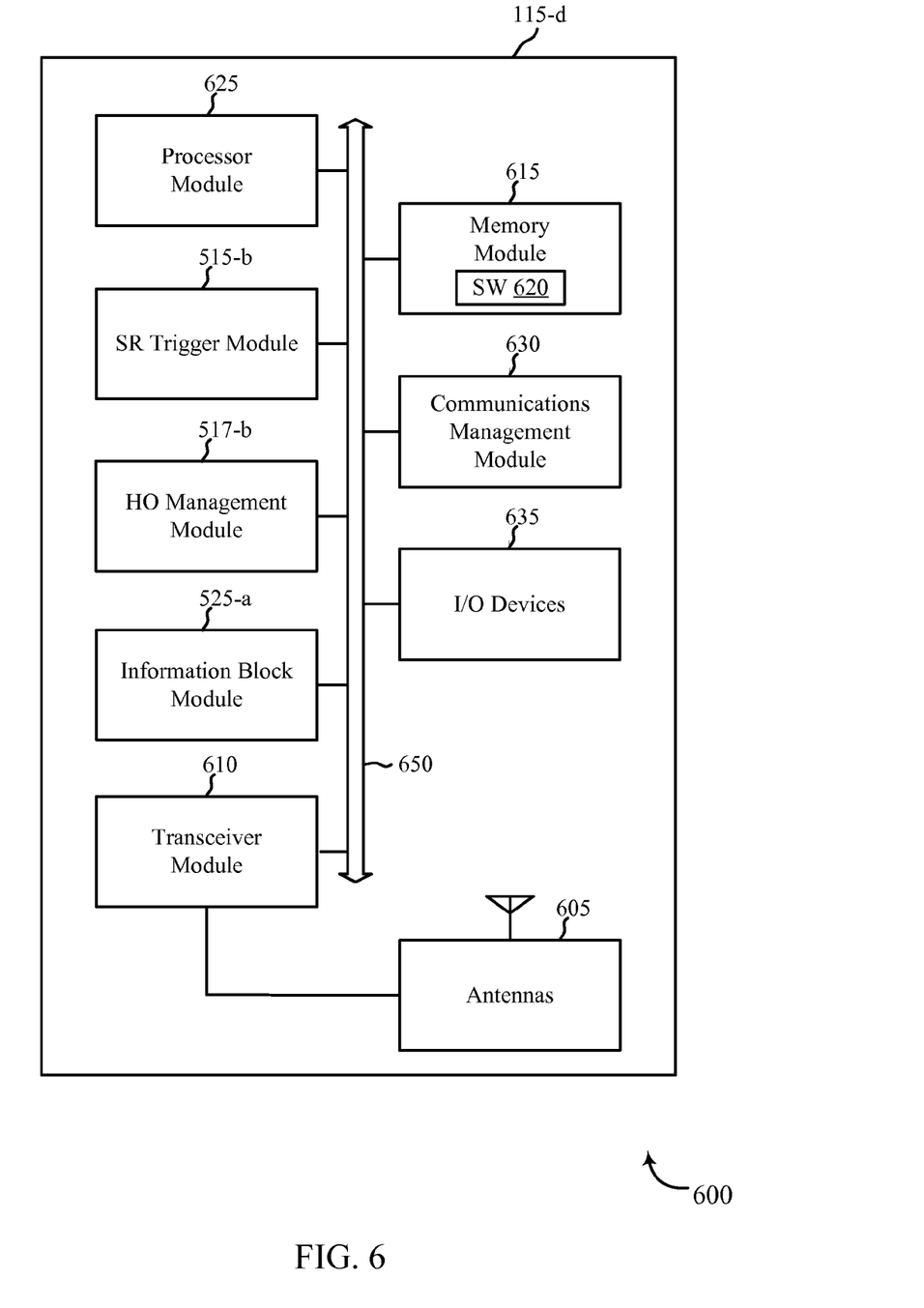
FIG. 6 shows a block diagram of a configuration for implementing a UE according to aspects of the disclosure.

FIG. 6 shows a block diagram 600 of a configuration for implementing a UE 115-*d*. The UE 115-*d* may be an example of one or more aspects of UEs 115 described with reference to FIGS. 1, 2A, 2B, 5A, and/or 5B. The UE 115-*d* may have an internal power supply (not shown), such as a small battery, to facilitate mobile operation. The UE 115-*d* may include one or more antennas 605 configured to receive and transmit wireless signals in cooperation with one or more transceiver modules 610. The UE 115-*d* may further include a SR trigger module 515-*b*, a HO management module 517-*b*, an information block module 525-*a*, a processor module 625, a communications management module 630, input/output (I/O) devices 635, and a memory 615, each of which may be in communication, directly or indirectly, with each other (e.g., over one or more buses 650).

The transceiver module 610 may be configured to communicate, such as bi-directionally via the antenna(s) 605, with other UEs and/or base stations of one or more networks. Thus, the transceiver module 610 or transceiver may be means for sending, transmitting, receiving and/or determining, alone or in combination with the various other modules of the UE 115-*d* and/or the antenna(s) 605. The transceiver module 610 may include a modem configured to modulate the packets and provide the modulated packets to the antenna(s) 605 for transmission, and to demodulate packets received from the antenna(s) 605. The transceiver module 610 may be implemented as at least one transmitter module and at least one separate receiver module. While the UE 115-*d* may include a single antenna, there may be aspects in which the UE 115-*d* may include multiple antennas 605.

The memory 615 may include random access memory (RAM) and read-only memory (ROM). The memory 615 may also store computer-readable, computer-executable software code 620 containing instructions that are configured to, when executed, cause the processor module 625 to perform various functions described herein (e.g., delaying triggering of a SR, etc.). Alternatively, the software code 620 may not be directly executable by the processor module 625, but may be configured to cause a computer, e.g., when compiled and executed, to perform functions described herein. Thus, the processor module 625 or processor may be means for initiating, establishing, starting, transmitting, monitoring restarting, setting, incrementing, resetting, determining, etc., alone or in combination with the memory 615 and the software code 620. The processor module 625 may include an intelligent hardware device, e.g., a central processing unit (CPU), a microcontroller, an application-specific integrated circuit (ASIC), etc. The processor module 625 may process information received through the transceiver module 610 and/or to be sent to the transceiver module 610 for transmission through the antenna(s) 605.

The one or more input/output (I/O) devices 635 may include one or more devices for receiving user input (e.g., buttons, keyboard, mouse, trackpad, touch-screen, microphone, etc.), sensing information (e.g., Global Positioning System (GPS) devices, gyroscopes, accelerometers, piezoelectric sensors, etc.), providing output to a user (e.g., display devices, speakers, motors, actuators, etc.), and/or other communication interfaces (e.g., infra-red communication devices, near-field communications (NFC) devices, etc.).

The SR trigger module 515-b may be configured to perform various monitoring, detecting, or determining operations as described herein. The SR trigger module 515-b may perform such operations in conjunction with the transceiver 610 and the antenna(s) 605. Further, the SR trigger module 515-b may operate under the control of the processor module 625. The SR trigger module 515-b may be an example of the SR trigger modules 515 of FIGS. 5A and/or 5B, and may implement the functionality for these modules described above.

The HO management module 517-b may be configured to perform various monitoring, detecting, or determining operations as described herein. The HO management module 517-b may perform such operations in conjunction with the transceiver 610 and the antenna(s) 605. Further, the HO management module 517-b may operate under the control of the processor module 625. The HO management module 517-b may be an example of the HO management modules 517 of FIGS. 5A and/or 5B, and may implement the functionality for these modules described above.

The information block module 525-a may be configured to perform various monitoring, detecting, or determining operations as described herein. The information block module 525-a may perform such operations in conjunction with the transceiver 610 and the antenna(s) 605. Further, the information block module 525-a may operate under the control of the processor module 625. The information block module 525-a may be an example of the information block module 525 of FIG. 5B, and may implement the functionality for this module described above. Although the SR trigger module 515-b, HO management module 517-b, and information block module 525-a are shown separately, the functionality of the SR trigger module 515-b, HO management module 517-b, and/or information block module 525-a may be implemented as a component of the transceiver module 610, the communications management module 630, as a computer program product, and/or as one or more controller elements of the processor module 625.

The UE 115-d may further include a communications management module 630, which may be configured to manage or otherwise control various communication operations of the UE 115-d, such as according to various radio protocols including operation on LTE/LTE-A networks. In particular, the communications management module 630 may support operations of the HO management module 517-b, the SR trigger module 515-b, and/or the information block module 525-a that involve determining if uplink timing information for a target base station has been acquired and/or derived after handover, delaying the triggering for uplink scheduling requests based on uplink timing acquisition, and suppression of a random access procedure as described above.

According to the architecture of FIG. 6, the HO management module 517-b, the SR trigger module 515-b, the information block module 525-a, and/or the communications management module 630 may be components of the UE 115-d in communication with some or all of the other components of the UE 115-d over the at least one bus 650. Additionally or alternatively, some or all of the various described functionality of these modules may be implemented as one or more components of the transceiver module 610, as a computer program product, as instructions embodied in one or more functions, subroutines, classes, modules, and/or packages of software code 620, and/or as one or more controller elements of the processor module 625.

The components of the UE 115-d may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the UE 115-d.

Figure 7:
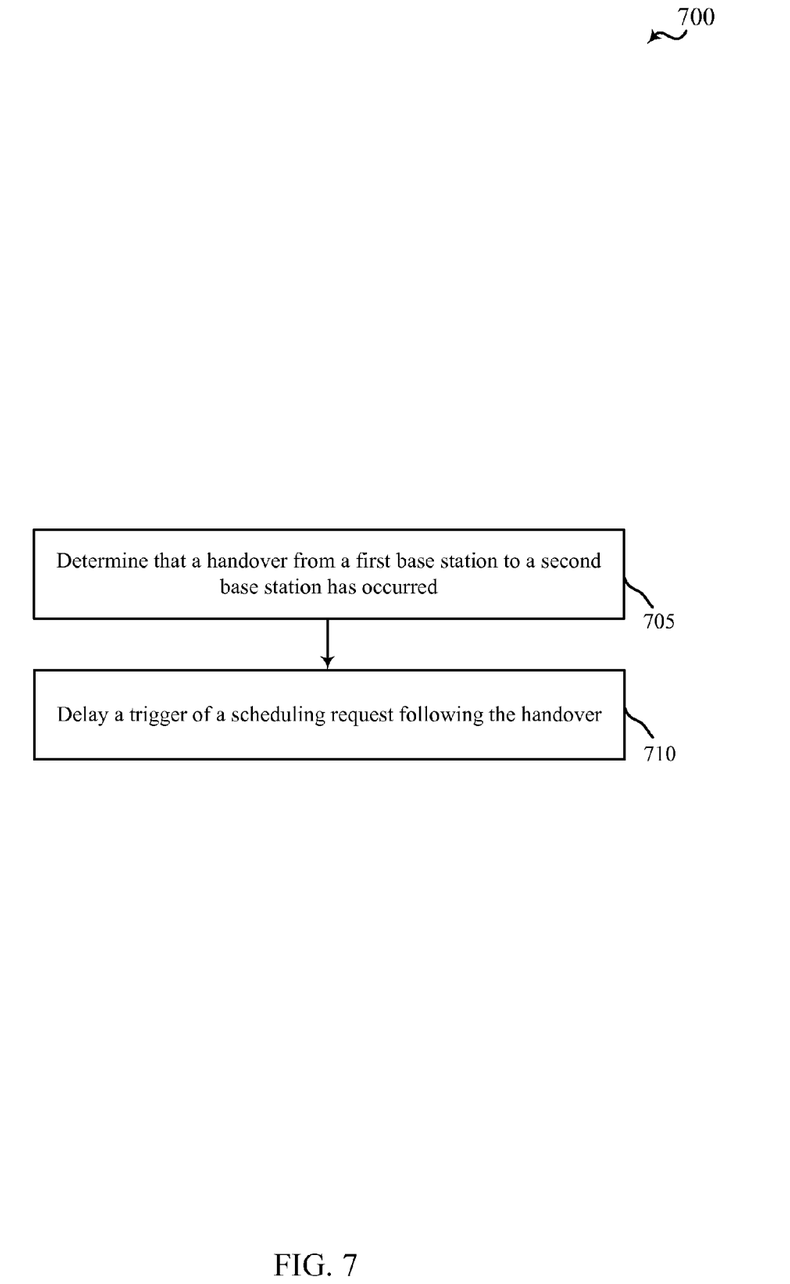
FIG. 7 is a flowchart of a method for wireless communications according to aspects of the disclosure.

FIG. 7 is a flowchart of a method 700 for delaying SR triggering following handover in a wireless communications device. For clarity, the method 700 is described below with reference to aspects of one or more of the UEs 115 described with reference to FIGS. 1, 2A, 2B, 5A, 5B and/or 6. In one implementation, a UE 115, or a processor module thereof, may execute one or more sets of codes to control the functional elements of the device to perform the functions described below.

At block 705, the UE may determine that a handover from a first base station to a second base station has occurred. At block 710, the UE may delay a trigger of a scheduling request following the handover. Such determination of a handover, and delay of triggering a SR may be performed as described above, according to various examples. For example, the SR may be delayed by a predetermined time period following a handover, may be delayed by a predetermined time period when it is determined that a MIB has not been successfully decoded, or may be dynamically delayed until a MIB is successfully decoded from the second base station, such as discussed above.

Figure 8:
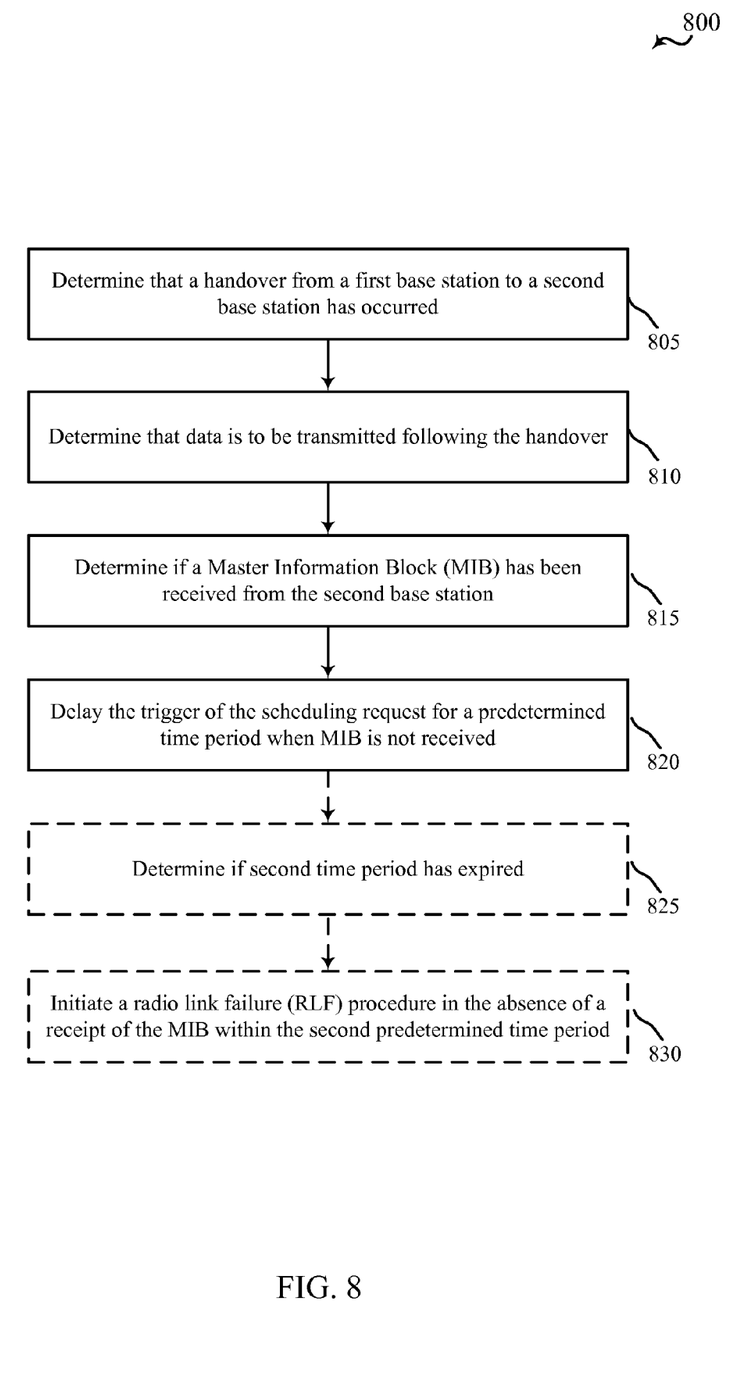
FIG. 8 is a flowchart of another method for wireless communications according to aspects of the disclosure.

FIG. 8 is a flowchart of a method 800 for delaying SR triggering following handover in a wireless communications device. For clarity, the method 800 is described below with reference to aspects of one or more of the UEs 115 described with reference to FIGS. 1, 2A, 2B, 5A, 5B and/or 6. In one implementation, a UE 115, or a processor module thereof, may execute one or more sets of codes to control the functional elements of the device to perform the functions described below.

At block 805, the UE may determine that a handover from a first base station to a second base station has occurred. At block 810, the UE may determine that data is to be transmitted following the handover. Such a determination may be made by determining that there is uplink data in the UE's buffer, for example. At block 815, the UE may determine if a Master Information Block (MIB) has been received from the second base station. If the MIB has not been received, the UE may delay the trigger of the scheduling request for a predetermined time period, as indicated at block 820. At optional block 825, the UE may determine if second time period has expired. Such a second time period may be an upper limit for receiving the MIB from the second base station, and may indicate that the UE should declare RLF. At block 830, the UE may initiate a RLF procedure in the absence of a receipt of the MIB within the second predetermined time period.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

Thus, the foregoing description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communications using a mobile device, comprising:
    determining that a handover from a first base station to a second base station has occurred; and
    delaying transmission of a scheduling request to the second base station for a predetermined time period based at least in part on determining an absence, at the mobile device, of receipt of a Master Information Block (MIB) from the second base station following the handover.

2. The method of claim 1, wherein the delaying the transmission of the scheduling request comprises:
    delaying the transmission of the scheduling request until a condition is satisfied.

3. The method of claim 2, wherein the condition being satisfied comprises:
    receiving the MIB from the second base station.

4. The method of claim 1, further comprising:
    determining that a System Information Block (SIB) has been received before the handover has occurred.

5. The method of claim 1, wherein the predetermined time period is based at least in part on an expected acquisition or an expected derivation of uplink timing through the MIB received from the second base station.

6. The method of claim 1, further comprising:
    determining that data is to be transmitted to the second base station following the handover;
    determining the absence of the MIB based on a determination that the MIB has not been received from the second base station following the handover; and
    delaying the transmission of the scheduling request for the predetermined time period.

7. The method of claim 6, further comprising:
    transmitting the scheduling request to the second base station based at least in part on determining that the MIB has been received following the handover.

8. The method of claim 1, further comprising:
    determining, after expiration of the predetermined time period, whether the MIB has been received; and
    further delaying the transmission of the scheduling request for a second predetermined time period responsive to determining a continued absence of the MIB from the second base station.

9. The method of claim 1, further comprising:
    transmitting the scheduling request responsive to determining that the MIB has been received.

10. The method of claim 1, further comprising:
    initiating a radio link failure (RLF) procedure in the absence of a receipt of the MIB within a second predetermined time period.

11. The method of claim 1, wherein the predetermined time period is based at least in part on a predetermined number of Long Term Evolution (LTE) frames.

12. An apparatus of wireless communications, comprising:
    means for determining that a handover from a first base station to a second base station has occurred; and
    means for delaying transmission of a scheduling request to the second base station for a predetermined time period based at least in part on determining an absence, at the apparatus, of receipt of a Master Information Block (MIB) from the second base station following the handover.

13. The apparatus of claim 12, wherein the means for delaying the transmission of the scheduling request delays the scheduling request until the MIB has been received from the second base station.

14. The apparatus of claim 12, further comprising:
    means for determining that a System Information Block (SIB) has been received before the handover has occurred.

15. The apparatus of claim 12, wherein the predetermined time period is based at least in part on an expected acquisition or an expected derivation of uplink timing through the MIB received from the second base station.

16. The apparatus of claim 12, further comprising:
    means for determining that data is to be transmitted to the second base station following the handover;
    means for determining the absence of the MIB based on a determination that the MIB has not been received from the second base station following the handover; and
    means for delaying the transmission of the scheduling request for the predetermined time period.

17. The apparatus of claim 16, further comprising:
    means for transmitting the scheduling request to the second base station based at least in part on determining that the MIB has been received following the handover.

18. The apparatus of claim 12, further comprising:
    means for determining, after expiration of the predetermined time period, whether the MIB has been received; and
    means for further delaying the transmission of the scheduling request for a second predetermined time period responsive to determining a continued absence of the MIB from the second base station.

19. The apparatus of claim 12, further comprising:
    means for transmitting the scheduling request responsive to determining that the MIB has been received.

20. The apparatus of claim 12, further comprising:
    means for initiating a radio link failure (RLF) procedure in the absence of a receipt of the MIB within a second predetermined time period.

21. An apparatus of wireless communications, comprising:
    a processor;
    memory in electronic communication with the processor; and
    instructions stored in the memory, the instructions being executable by the processor to:

determine that a handover from a first base station to a second base station has occurred; and delay transmission of a scheduling request to the second base station for a predetermined time period based at least in part on determining an absence, at the processor, of receipt of a Master Information Block (MIB) from the second base station following the handover.

22. The apparatus of claim 21, wherein the delaying the transmission of the scheduling request comprises:

delaying the scheduling request until the MIB has been received from the second base station.

23. The apparatus of claim 21, wherein the instructions are further executable by the processor to:

determine that data is to be transmitted to the second base station following the handover;

determine the absence of the MIB based on a determination that the MIB has not been received from the second base station following the handover; and delay the transmission of the scheduling request for the predetermined time period.

24. The apparatus of claim 21, wherein the instructions are further executable by the processor to:

determine, after expiration of the predetermined time period, whether the MIB has been received; and further delay the transmission of the scheduling request for a second predetermined time period responsive to determining a continued absence of the MIB from the second base station.

25. The apparatus of claim 21, wherein the instructions are further executable by the processor to:

transmit the scheduling request responsive to determining that the MIB has been received.

26. The apparatus of claim 21, wherein the instructions are further executable by the processor to:

initiate a radio link failure (RLF) procedure in the absence of a receipt of the MIB within a second predetermined time period.

27. A non-transitory computer-readable medium storing computer executable code for wireless communication, the code executable by a processor to:

determine that a handover from a first base station to a second base station has occurred; and delay transmission of a scheduling request to the second base station for a predetermined time period based at least in part on determining an absence of receipt of a Master Information Block (MIB) from the second base station following the handover.

* * * * *